US011022488B1

(12) United States Patent
Lita et al.

(10) Patent No.: US 11,022,488 B1
(45) Date of Patent: Jun. 1, 2021

(54) SPECTROMETER FOR VNIR SPECTROMETRY

(71) Applicant: Malvern Panalytical Inc., Westborough, MA (US)

(72) Inventors: Bogdan Lita, Westborough, MA (US); Leonid Feldman, Westborough, MA (US)

(73) Assignee: Malvern Panalytical Inc., Westborough, MA (US)

( * ) Notice: Subject to any disclaimer, the term of this patent is extended or adjusted under 35 U.S.C. 154(b) by 0 days.

(21) Appl. No.: 16/445,669

(22) Filed: Jun. 19, 2019

(51) Int. Cl.
*G01J 3/28* (2006.01)
*G01J 3/02* (2006.01)
*G02B 5/18* (2006.01)

(52) U.S. Cl.
CPC ........... *G01J 3/0208* (2013.01); *G01J 3/2823* (2013.01); *G02B 5/1861* (2013.01)

(58) Field of Classification Search
CPC .... G01J 3/02; G01J 3/18; G01J 3/2803; G01J 3/2823; G01J 3/28
USPC ........................................................ 356/328
See application file for complete search history.

(56) References Cited

U.S. PATENT DOCUMENTS

| 4,568,187 | A | 2/1986 | Kita et al. | |
|---|---|---|---|---|
| 2010/0277732 | A1 | 11/2010 | Xiang et al. | |
| 2012/0212812 | A1* | 8/2012 | Weber | G03B 21/604 359/454 |
| 2014/0226158 | A1* | 8/2014 | Trainer | G02B 6/32 356/336 |
| 2018/0280723 | A1* | 10/2018 | Enwemeka | A61L 2/08 |
| 2019/0186990 | A1* | 6/2019 | Oana | G01J 3/0256 |
| 2019/0374092 | A1* | 12/2019 | Wu | G01J 3/0224 |

OTHER PUBLICATIONS

Malvern Panalytical. "ASD FieldSpec 4 Hi-Res High Resolution Spectroradiometer" located at <https://www.malvernpanalytical.com/en/products/product-range/asd-range/fieldspec-range/fieldspec4-hi-res-high-resolution-spectroradiometer?creative=332029566123&keyword=&matchtype=b&network=g&device=c&gclid=EAlaIQobChMI0ITH2q235AIVBp6fCh1lnwMTEAAYASAAEgJSUPD_BwE> visited on Sep. 4, 2019 (25 pages).
"Concavus Spectrometers," located at https://web.archive.org/web/20190824002656/http:/www.gratingworks.com/products/spectrometers/concavus-spectrometers/ visited on Aug. 24, 2019 (6 pages).

* cited by examiner

*Primary Examiner* — Md M Rahman
(74) *Attorney, Agent, or Firm* — Morrison & Foerster LLP

(57) ABSTRACT

A spectrometer is disclosed, comprising: a light source configured to receive light from a scene; a diffraction grating configured to receive a light beam from the light source and to disperse the light beam to form a dispersed light beam, the diffraction grating comprising an axis of normal incidence and a plurality of grooves, these defining a plane that includes the axis of normal incidence and which is normal to the grooves; a detector configured to detect the dispersed light beam; wherein the angle of incidence, between the light beam and the axis of normal incidence in the plane, is 5 to 8 degrees, and the out-of-plane angle, between the light beam and the axis of normal incidence outside the plane is 1.5 to 4 degrees. A correcting lens may be provided, disposed between the diffraction grating and the detector.

20 Claims, 5 Drawing Sheets

SPECTROMETER FOR VNIR SPECTROMETRY

FIELD OF THE INVENTION

The present invention relates to a spectrometer, for example for performing VNIR spectrometry.

BACKGROUND OF THE INVENTION

Spectrometers are instruments that allow a property of light to be determined as a function of its wavelength, typically intensity.

Spectrometers typically include a dispersive element, such as a diffraction grating, for separating different wavelengths of incident light from an entrance slit onto a detector. An important figure of merit for a spectrometer is the spectral resolution (SR), which may be defined as the slit image full width half maximum (FWHM) at the detector. The spectral resolution of a spectrometer typically varies over the range of wavelengths (spectral range) that a spectrometer is designed to detect. For example, the spectral resolution may be minimal at a central wavelength in the spectral range, and increase towards the limits of the spectral range. The shape of a curve showing spectral resolution as a function of wavelength may thereby exhibit a "U" shaped curve.

It is desirable that spectrometers are both low cost and compact. This imposes certain design constraints on how a spectrometer can be designed.

An example of a prior art spectrometer is the ASD FieldSpec® 4 Hi-Res, which is a high resolution spectroradiometer from Malvern Panalytical. US2010/277732 discloses a spectrometer with a concave diffraction grating and transmissive correctors.

It is desirable for spectrometers to have a high spectral resolution. It is also desirable for the variation in spectral resolution to be low over the spectral range.

SUMMARY OF THE INVENTION

According to a first aspect, there is provided a spectrometer, comprising:
 a light source configured to receive light from a scene;
 a diffraction grating configured to receive a light beam from the light source and to disperse the light beam to form a dispersed light beam, the diffraction grating comprising an axis of normal incidence and a plurality of grooves, these defining a plane that includes the axis of normal incidence and which is normal to the grooves;
 a detector configured to detect the dispersed light beam;
 wherein the angle of incidence, between the light beam and the axis of normal incidence in the plane, is 5 to 8 degrees, and the out-of-plane angle, between the light beam and the axis of normal incidence outside the plane is 1.5 to 4 degrees.

According to a second aspect, there is provided a spectrometer, comprising:
 a light source;
 a diffraction grating configured to receive a light beam from the light source and to disperse the light beam to form a dispersed light beam, the diffraction grating comprising an axis of normal incidence and a plurality of grooves, these defining a plane that includes the axis of normal incidence and which is normal to the grooves;
 a mount arranged to support the light source, wherein the mount is configured to allow adjustment of at least one of:
  i) a distance from the light source to the diffraction grating;
  ii) an orientation of the light source by rotation of the light source about the light beam axis;
  iii) a lateral position of the light source in a plane normal to the light beam axis; and
 a detector configured to detect the dispersed light beam.

BRIEF DESCRIPTION OF THE DRAWINGS

Embodiments of the invention will be described, purely by way of example, with reference to the accompany drawings, in which.

DETAILED DESCRIPTION OF THE INVENTION

Figure 1:
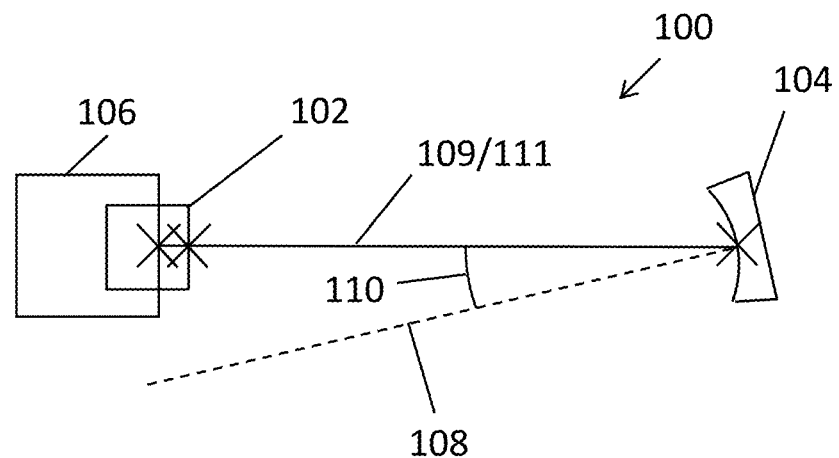
FIG. 1 is a schematic of a spectrometer showing the Littrow angle of incidence at a diffraction grating (viewing plane including the axis of normal incidence to the grating and normal to the grooves)
Figure 2:
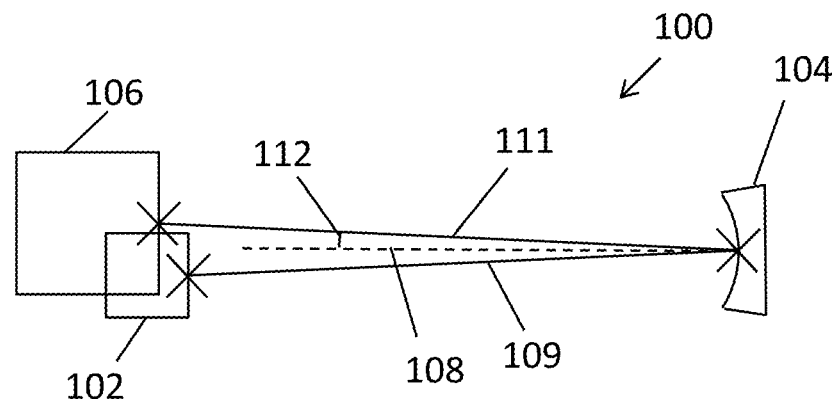
FIG. 2 is a schematic of a spectrometer according to the invention showing the out-of-plane angle.

FIGS. 1 and 2 show a schematic spectrometer 100, comprising: light source 102, diffraction grating 104 and detector 106.

The diffraction grating 104 is concave, and is designed to focus diffracted light onto a flat surface. The diffraction grating 104 comprises parallel grooves on its surface for diffracting light, and has an axis 108 defining normal incidence with the grooved surface. The view shown in FIG. 1 is of a plane including the axis of normal incidence to the grating and normal to the grooves. The grating 104 is configured for use in a Littrow configuration, in which the diffraction angle and the incidence angle 110 are identical at a reference wavelength (this common angle may be termed the Littrow angle).

The light source 102 in this embodiment is an entrance slit that is configured to receive light from a scene. The light from entrance slit provides a light beam 109, incident on the grating 104. The light beam 109 is reflected and dispersed by the grating 104 to form a dispersed light beam 111, which is incident on the detector 106. Light at the reference wavelength (700 nm in this example) will have an incident light beam 109 and dispersed light beam 111 that are coincident in the plane normal to the grooves.

The detector 106 comprises an array of detector elements. The position of light at the detector 106 depends on the degree to which the incident light beam is dispersed by the diffraction grating 104, which in turn depends on the wavelength of the light. Light received at different detector elements therefore corresponds with different wavelengths of light.

In order to accommodate the entrance slit 102 and detector 106 at approximately the focal distance of the diffraction grating, it is convenient for the incident light beam 109 and the dispersed light beam 111 to be in different planes (i.e. not both lying in the plane normal to the grooves), so that they are at an angle to this plane. This out-of-plane angle enables the projection of the entrance slit 102 and detector 106 to overlap in the plane normal to the grooves without occupying the same physical space. The out-of-plane angle 112 is shown in FIG. 43. The incident light beam 109 and the dispersed light beam 111 are both at the same out-of-plane angle 112 to the normal axis of the grating 104 (which lies in the plane normal to the grooves).

Figure 7:
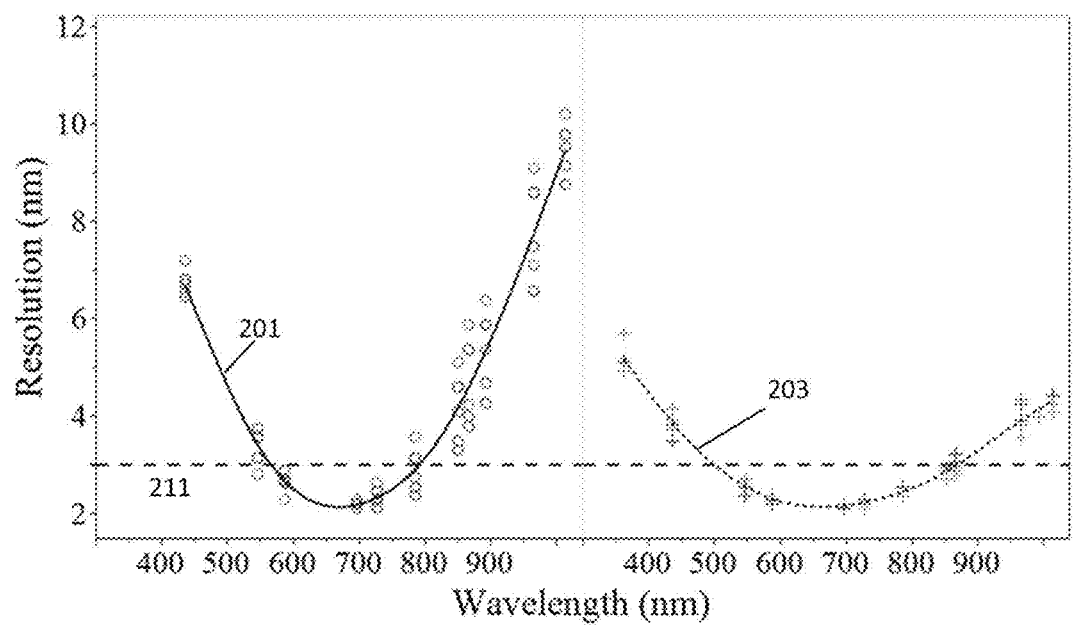
FIG. 7 is a graph comparing spectral resolution (FWHM) vs wavelength for a prior art spectrometer and for an embodiment.

In this example the Littrow angle 110 is 7.5 degrees, and the out-of-plane angle 112 is 5.5 degrees. FIG. 7 illustrates the spectral resolution 201 of this example. This design has a spectral range (i.e. a range of wavelengths that are detectable) of 350 nm to 1050 nm. The spectral resolution has a maximum value of around 14 nm at a wavelength of 350 nm, with a minimum of around 3 nm over the range of 600 nm to 800 nm.

Figure 3:
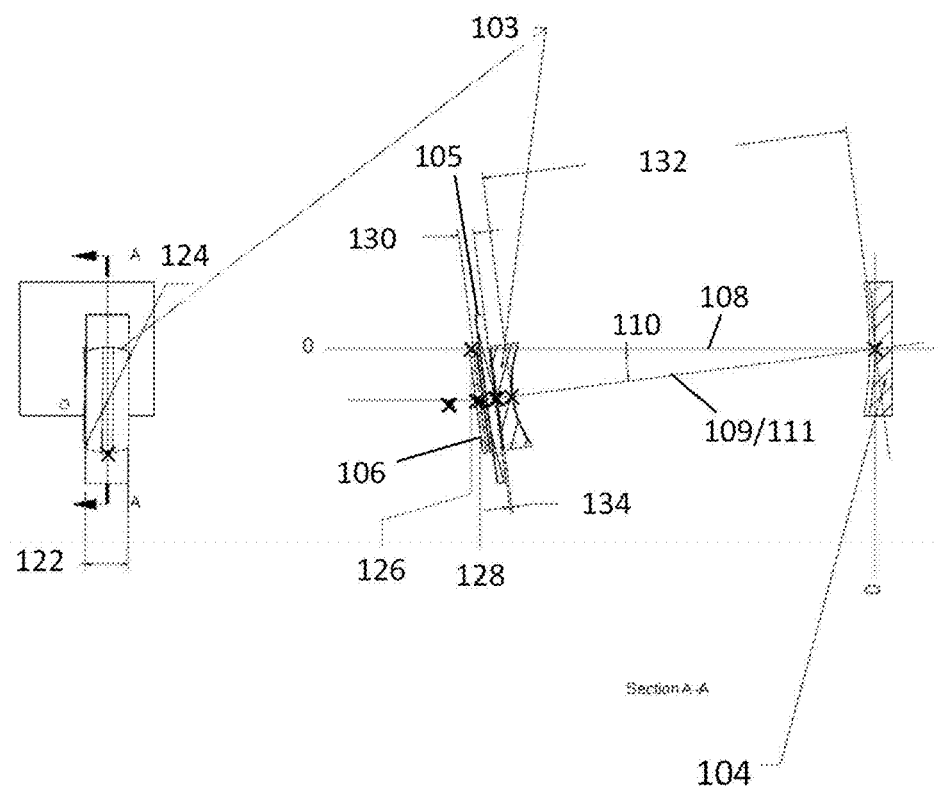
FIG. 3 is view of a spectrometer according to a first embodiment (viewing plane including the axis of normal incidence to the grating and normal to the grooves)
Figure 4:
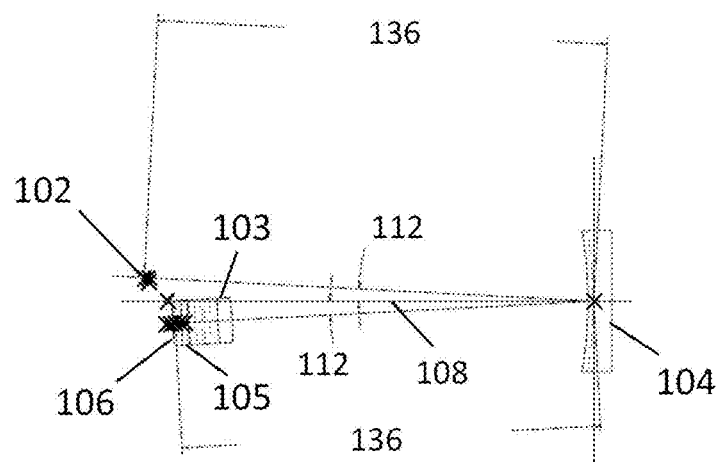
FIG. 4 is a further view of the spectrometer of FIG. 3, showing the out-of-plane angle.

FIGS. 3 and 4 show a spectrometer according to a first example embodiment, with FIG. 3 showing the "in-plane" view (i.e. a plane normal to the grooves), and the FIG. 4 showing the "out-of-plane" view (i.e. a plane parallel to the grooves and including the normal axis of the grating 104).

The spectrometer comprises a light source 102, diffraction grating 104, detector 106, correcting lens 103, and filter 105.

Figure 8:
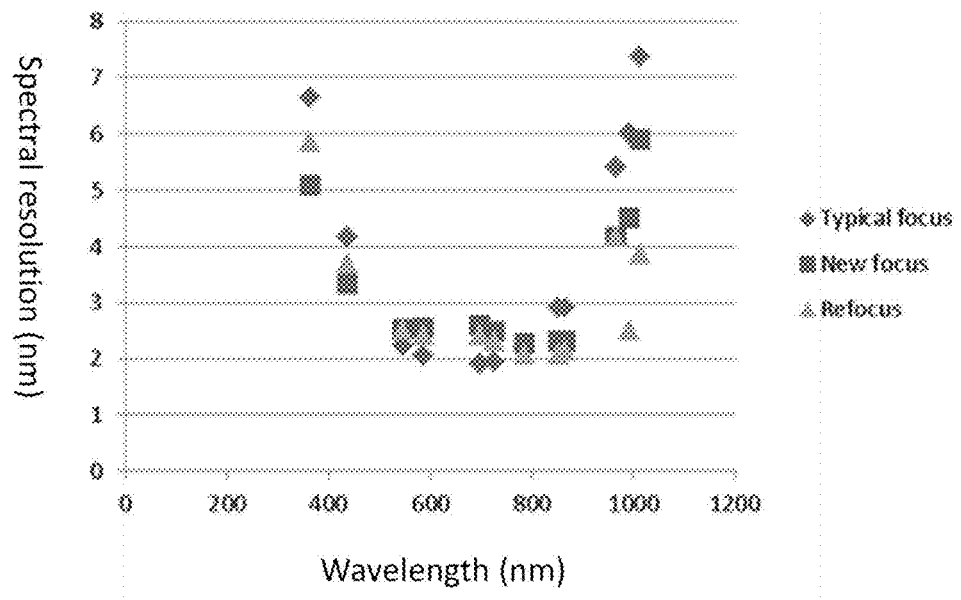
FIG. 8 is an example of experimentally measured spectral resolution before and after refocusing.

The light source 102 in this embodiment is an entrance slit 102, which may conveniently be provided by a fibre bundle, supported in a fibre bundle holder (for example, as shown in FIG. 8), with a proximal end of the fibre bundle arranged in a substantially rectangular pattern (e.g. a 1×n or 2×n array of fibre tips). The distal end of the fibre bundle may be directed at a scene or object from which a spectra is to be obtained. The nominal entrance slit width is determined by the effective width of the fibre bundle at the proximal end, in this case approximately 100 microns. The entrance slit 102 may be positioned rearward of the centre of curvature of the grating 104, with the distance 136 along the light beam 109 greater than the radius of curvature of the grating 104, for example by 2 mm to 10 mm.

The centre of curvature of the grating 104 is indicated by reference numeral 126 and the centre of the detector 106 is indicated by reference numeral 128. The projection of the position of the centre of the detector 106 in the plane of FIG. 3 is slightly closer (e.g. 2 mm to 10 mm) to the grating than the centre of curvature 126 due to the out-of-plane angle 112. The detector 106 may be positioned near to (or at) the centre of curvature of the grating 104.

A correcting lens 103 is provided between the detector 106 and the diffraction grating, spaced apart from the detector by a short distance 130 (e.g. 4 mm or less). The correcting lens 103 in the example of FIG. 3 is a planoconcave lens, with the planar side facing the detector 106. The correcting lens 103 has a diameter of between 10 mm and 40 mm and may be cut-down to yield a reduced aperture (e.g. a width 122 of <20 mm and diameter 124 of <35 mm).

The filter 105 is disposed between the correcting lens 103 and the detector 106, and comprises an order sorting filter, which may improve the signal to noise ratio at the detector 106 by rejecting wavelengths outside the design passband of the spectrometer. The filter 105 maybe spaced apart from the planar surface of the lens 103, for example by less than 0.5 mm.

The Littrow angle 110 in the embodiment of FIGS. 3 and 4 is between 7 and 8 degrees, for example 7.5 degrees. The out-of-plane angle 112, shown in FIG. 4, is less than 3 degrees, for example 2.9 degrees.

The detector 106 is a photodiode array. The centre of the detector 106 is at a distance 136 along the dispersed light beam 111 that is slightly less (e.g. between 2 mm and 10 mm less) than the radius of curvature of the grating 104.

FIG. 7 shows the spectral resolution 203 of the embodiment of FIGS. 3 and 4 (including the correcting lens 103 and with the reduced out-of-plane angle 112 of approximately 2.9 degrees, but with the same Littrow angle 110 and grating 104 as in FIGS. 1 and 2). The reduction of the out-of-plane angle and the lens 103 greatly improves the spectral resolution, but the inclusion of the correcting lens 103 has reduced the spectral range slightly, to 375 nm to 1000 nm. Over this spectral range there is only a very small wavelength region where the spectral resolution exceeds 5 nm, which is a great improvement in performance over the design of FIGS. 1 and 2.

Figure 5:
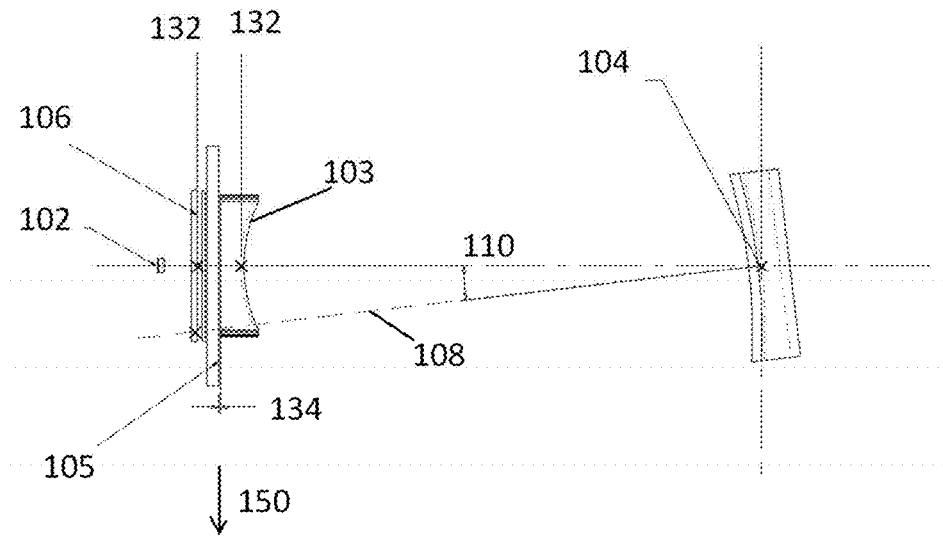
FIG. 5 is a view of a spectrometer according to a second embodiment (viewing plane including the axis of normal incidence to the grating and normal to the grooves)
Figure 6:
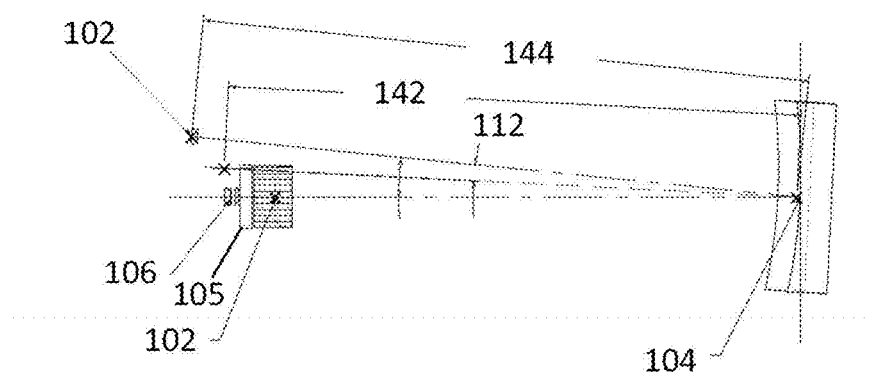
FIG. 6 is a further view of the spectrometer of FIG. 4, showing the out-of-plane angle.

FIGS. 5 and 6 show a further embodiment, which is similar to that of FIGS. 3 and 4, but in which an alternative grating is used, with a lower groove density, and a corresponding reduction in Littrow angle in order to maintain a reference wavelength of 700 nm. The reduction in groove density results in increased relative linear dispersion at the detector, with the result that a greater range of wavelengths can be detected with the same detector geometry, increasing the spectral resolution of the device.

The detector 106, lens 103, slit 102 and filter 103 in the example of FIGS. 5 and 6 may be the same as that of the embodiment of FIGS. 3 and 4. The entrance slit 102 is again positioned rearward of the centre of curvature of the grating 104, so that the distance 144 along the light beam 109 is at least 2 mm greater (e.g. 2 mm to 10 mm greater) than the distance 142 along the grating normal to the centre of curvature.

The Littrow angle 110 of the grating (and the entrance slit 102 and detector 106 with the grating 104) in this embodiment is around 6.75 degrees, with the out-of-plane angle remaining in the same range/value. The spectral resolution of this embodiment, is very similar to that of the embodiment of FIGS. 3 and 4 but with an increased spectral range of 350 nm to 1050 nm. The spectral resolution is below 5 nm over substantially the full spectral range (i.e. >95%) and is 3 nm or below in the range 400 nm to 850 nm. The dispersion direction 150 is illustrated in FIG. 5.

In general, the applicant has found that reducing the out-of-plane angle may provide improved spectral resolution. The applicant has further found that the use of a correcting lens between the detector and grating may improve spectral resolution.

The applicant has found that the spectral resolution is sensitive to the position and orientation of the entrance slit 102, and that slightly defocusing the position of the entrance slit (e.g. moving it further backward from a focal position of the grating 104) may improve the spectral resolution. The spectral resolution of a particular embodiment may be optimised empirically by adjustment of the position/orientation of the entrance slit 102, after the grating 104 and detector 106 are fixed in place.

FIG. 8 illustrates results obtained by adjusting the position of the entrance slit 102. Significant improvements in the spectral resolution can be obtained at wavelengths shorter than 400 nm and/or higher than 800 nm.

Figure 9:
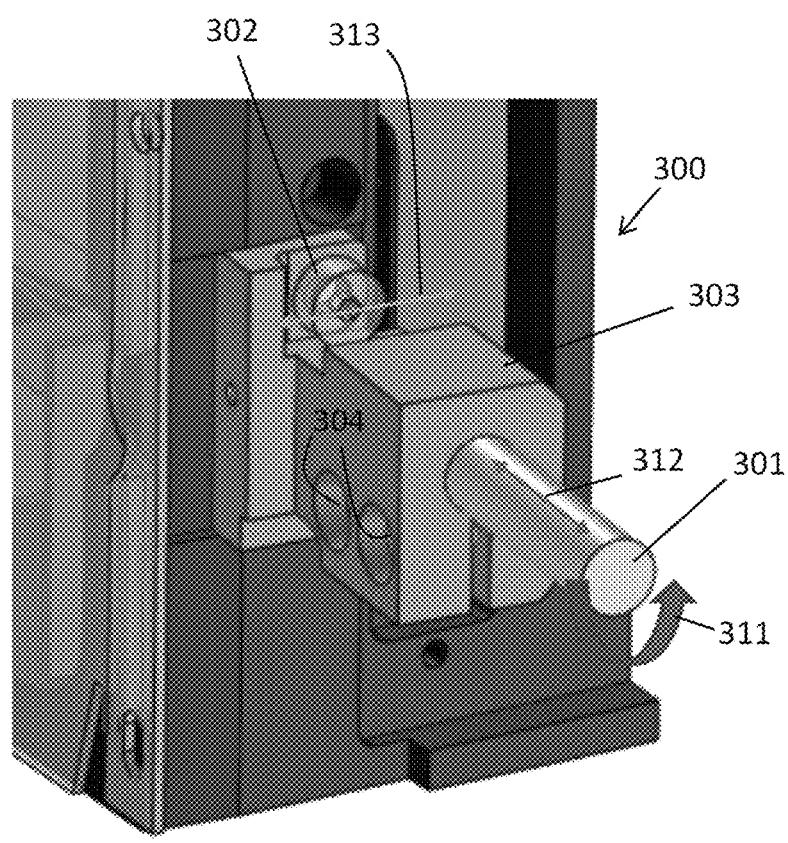
FIG. 9 is a view of an example adjustable light source holder.

FIG. 9 illustrates a light source holder 300, which facilitates adjustment of the position/orientation of the light source 102 in the instrument. The light source holder may be configured to hold a fibre bundle that provides a light source in the form of an entrance slit. The light source adjuster may be configured to provide: adjustment of lateral position (parallel to the grooves of the grating 104) as indicated by arrow 302, adjustment of the longitudinal position of the light source/entrance slit 102 along the light beam 109 (i.e. closer or further from the grating 104), as indicated by arrow 312; and/or the orientation of the light source/entrance slit, as indicated by arrow 311. The lateral adjustment is enabled by loosening and tightening fastener 302. The longitudinal and orientation adjustments are facilitated by loosening and tightening a light source (e.g. fibre bundle) clamp 303 using the at least one fastener 304.

Although specific embodiments have been described these are not intended to limit the invention, which should be determined with reference to the accompanying claims, with due regard for equivalents.

The invention claimed is:

1. A spectrometer, comprising:
   an entrance slit for receiving light from a scene;
   a diffraction grating configured to receive a light beam from the entrance slit and to disperse the light beam to form a dispersed light beam, the diffraction grating comprising an axis of normal incidence and a plurality of grooves, these defining a plane that includes the axis of normal incidence and which is normal to the grooves;
   a detector configured to detect the dispersed light beam;
   wherein the angle of incidence, between the light beam and the axis of normal incidence in the plane, is 5 to 8 degrees, and the out-of-plane angle, between the light beam and the axis of normal incidence outside the plane is 1.5 to 4 degrees.

2. The spectrometer of claim 1, further comprising a fibre bundle configured to receive light from the scene at a distal end, the fibre bundle arranged in a rectangular configuration at a proximal end, forming the entrance slit.

3. The spectrometer of claim 2, further comprising a mount arranged to support the proximal end of the fibre bundle, wherein the mount is configured to allow adjustment of at least one of:
   i) a distance from the proximal end to the diffraction grating;
   ii) an orientation of the proximal end by rotation of the proximal end about the light beam axis;
   iii) a lateral position of the proximal end in a plane normal to the light beam axis.

4. The spectrometer of claim 1, further comprising a correcting lens between the diffraction grating and the detector.

5. The spectrometer of claim 4, wherein the correcting lens comprises a plano-concave lens.

6. The spectrometer of claim 1, wherein the spectral range includes 400-1000 nm.

7. The spectrometer of claim 6, wherein the spectral resolution over the spectral range is 6 nm or less.

8. The spectrometer of claim 6, wherein the minimum spectral resolution over the spectral range is less than 3 nm.

9. The spectrometer of claim 1, wherein the optical path length between the entrance slit and the diffraction grating is less than 150 mm.

10. The spectrometer of claim 9, wherein the optical path length between the diffraction grating and the entrance slit is longer than the optical path length between the diffraction grating and the detector.

11. The spectrometer of claim 1, wherein the detector comprises a planar array of photodetectors.

12. A spectrometer, comprising:
    an entrance slit for receiving light from a scene;
    a diffraction grating configured to receive a light beam from the entrance slit and to disperse the light beam to form a dispersed light beam, the diffraction grating comprising an axis of normal incidence and a plurality of grooves, these defining a plane that includes the axis of normal incidence and which is normal to the grooves;
    a mount arranged to support the entrance slit, wherein the mount is configured to allow adjustment of at least one of:
    i) a distance from the entrance slit to the diffraction grating;
    ii) an orientation of the light source by rotation of the entrance slit about the light beam axis;
    iii) a lateral position of the entrance slit in a plane normal to the light beam axis; and
    a detector configured to detect the dispersed light beam.

13. The spectrometer of claim 12, comprising a fibre bundle configured to receive light from the scene at a distal and, the fibre bundle arranged in a rectangular configuration at a proximal end, forming the entrance slit.

14. The spectrometer of claim 12, wherein the angle of incidence, between the light beam and the axis of normal incidence in the plane, is 5 to 8 degrees, and the out-of-plane angle, between the light beam and the axis of normal incidence outside the plane is 1.5 to 4 degrees.

15. The spectrometer of claim 12, further comprising a correcting lens between the diffraction grating and the detector.

16. The spectrometer of claim 15, wherein the correcting lens comprises a plano-concave lens and/or the diffraction grating comprises a grating.

17. The spectrometer of claim 12, wherein the spectral range includes 400-1000 nm.

18. The spectrometer of claim 17, wherein the spectral resolution over the spectral range is 6 nm or less and/or the minimum spectral resolution over the spectral range is less than 3 nm.

19. The spectrometer of claim 12, wherein an optical path length between the entrance slit and the diffraction grating is less than 150 mm and an optical path length between the diffraction grating and the entrance slit is longer than an optical path length between the diffraction grating and the detector.

20. The spectrometer of claim 12, wherein the detector comprises a planar array of photodetectors.

* * * * *